US011572865B2

(12) United States Patent
Vasudevan et al.

(10) Patent No.: US 11,572,865 B2
(45) Date of Patent: Feb. 7, 2023

(54) METHOD AND SYSTEM FOR CONTROLLING A WIND TURBINE TO REDUCE NACELLE VIBRATION

(71) Applicant: VESTAS WIND SYSTEMS A/S, Aarhus N (DK)

(72) Inventors: Karthik Vasudevan, Viby J (DK); Poul Brandt Christensen, Ry (DK); James Alexander Nichols, Aarhus C (DK); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/259,473

(22) PCT Filed: Jul. 3, 2019

(86) PCT No.: PCT/DK2019/050215
§ 371 (c)(1),
(2) Date: Jan. 11, 2021

(87) PCT Pub. No.: WO2020/011323
PCT Pub. Date: Jan. 16, 2020

(65) Prior Publication Data
US 2021/0277869 A1    Sep. 9, 2021

(30) Foreign Application Priority Data

Jul. 11, 2018    (DK) .......................... PA 2018 70480

(51) Int. Cl.
*F03D 7/02*    (2006.01)
(52) U.S. Cl.
CPC .........    *F03D 7/0224* (2013.01); *F03D 7/0296* (2013.01); *F05B 2260/966* (2013.01);
(Continued)

(58) Field of Classification Search
None
See application file for complete search history.

(56) References Cited

U.S. PATENT DOCUMENTS 10,669,990 B2 *    6/2020    Kjær ..................... F03D 7/0224
2008/0247873 A1 *    10/2008    Egedal ................... F03D 7/043
416/61
(Continued)

FOREIGN PATENT DOCUMENTS

DE    102007063082 A1    6/2009
DE    102010023887 A1    12/2011
(Continued)

OTHER PUBLICATIONS

Patent Cooperation Treaty International Search Report for Application No. PCT/DK2019/050125 dated Sep. 19, 2019.
(Continued)

*Primary Examiner* — Michael Lebentritt
(74) *Attorney, Agent, or Firm* — Patterson + Sheridan, LLP (57) ABSTRACT

The present invention relates to a method of controlling a wind turbine comprising a tower supporting a rotor comprising a plurality of pitch-adjustable rotor blades. The method includes obtaining a movement signal indicative of a lateral movement of the tower; determining a pitch modulation signal, based on the movement signal, for actuating a rotor blade to produce a desired horizontal force component to counteract the lateral movement of the tower; determining a radial force component acting on a rotor blade; determining a phase offset parameter for the rotor blade based on the radial force component; and, transforming the pitch modulation signal into a pitch reference offset signal for the rotor blade based on the phase offset parameter.

18 Claims, 11 Drawing Sheets

(52) U.S. Cl.
CPC ... *F05B 2270/328* (2013.01); *F05B 2270/329* (2013.01); *F05B 2270/331* (2013.01); *F05B 2270/334* (2013.01)

(56) References Cited

U.S. PATENT DOCUMENTS

| | | | |
|---|---|---|---|
| 2010/0111693 A1 | 5/2010 | Wilson | |
| 2011/0115233 A1 | 5/2011 | Schroppel | |
| 2012/0257967 A1 | 10/2012 | Egedal et al. | |
| 2012/0294716 A1* | 11/2012 | Roesmann | H02P 25/024 |
| | | | 416/1 |
| 2016/0377057 A1* | 12/2016 | Caponetti | F03D 9/25 |
| | | | 416/1 |
| 2018/0017042 A1 | 1/2018 | Baun et al. | |
| 2018/0142676 A1* | 5/2018 | Pedersen | F03D 13/35 |
| 2020/0088165 A1* | 3/2020 | Nielsen | F03D 7/0224 |
| 2021/0231102 A1* | 7/2021 | Thomsen | F03D 7/0296 |

FOREIGN PATENT DOCUMENTS

| | | |
|---|---|---|
| DE | 102014225502 A1 | 6/2015 |
| WO | 2010016764 A1 | 2/2010 |
| WO | 2015086023 A1 | 6/2015 |
| WO | 2020011323 A1 | 1/2020 |

OTHER PUBLICATIONS

PCT Written Opinion of the International Searching Authority for Application PCT/DK2019/050215 dated Sep. 19, 2019.
Danish Patent and Trademark Office 1st Technical Examination of Patent No. PA 2018 70480 dated Jan. 31, 2019.
Danish Patent and Trademark Office Search Report for Application No. PA 2018 70480 dated Jan. 31, 2019.

* cited by examiner

METHOD AND SYSTEM FOR CONTROLLING A WIND TURBINE TO REDUCE NACELLE VIBRATION

FIELD OF THE INVENTION

This invention relates to the control of a wind turbine to reduce nacelle vibration.

BACKGROUND

Wind turbines as known in the art comprise a tower supporting a nacelle and a rotor with a number of pitch-adjustable rotor blades. Such wind turbines are prone to vibrations since they comprise a large mass positioned at the end of a slender tower. For this reason, a key requirement for controlling the vibrational behaviour of wind turbines is to prevent any exciting rotor forces, produced from imbalances in the rotor, from resonating with the natural bending frequencies of the tower.

It is against this background that the invention has been devised.

STATEMENTS OF INVENTION

According to a first aspect of the invention, there is provided a method of controlling a wind turbine comprising a tower supporting a rotor comprising a plurality of pitch-adjustable rotor blades, the method comprising: obtaining a movement signal indicative of a lateral movement of the tower; determining a pitch modulation signal, based on the movement signal, for actuating a rotor blade to produce a desired horizontal force component to counteract the lateral movement of the tower; determining a radial force component acting on a rotor blade; determining a phase offset parameter for the rotor blade based on the radial force component; and, transforming the pitch modulation signal into a pitch reference offset signal for the rotor blade based on the phase offset parameter.

Preferably, the radial force component is determined based on a deflection of the rotor blade.

Preferably, the deflection is in the flapwise direction of the rotor blade.

Preferably, the radial force component is determined based on a distance the rotor blade deflects from a longitudinal axis of the rotor blade.

Preferably, the distance extends perpendicularly from the longitudinal axis of the rotor blade to the tip of the rotor blade.

In one embodiment, the distance is determined based on the thrust acting on the rotor blade. Alternatively, the distance is scheduled according to an operating condition of the wind turbine. Alternatively, the distance is determined based on the bending moment of the rotor blade.

Preferably, the radial force component is determined based on an integration of the lift force along the rotor blade.

Preferably, the horizontal force component is a component of a resultant force based on an edgewise force acting on the rotor blade and the radial force component.

Preferably, the phase offset parameter is determined based on additional in-plane force components.

Preferably, the phase offset parameter is determined based on an azimuth angle of the rotor blade.

According to a second aspect of the invention, there is provided a controller for a wind turbine control system comprising a processor and a memory module, wherein the memory module comprises a set of program code instructions which when executed by the processor implement a method according to the first aspect of the invention.

According to a third aspect of the invention, there is provided a wind turbine comprising a tower supporting a rotor comprising a plurality of pitch-adjustable rotor blades and a controller according to the second aspect of the invention.

According to a fourth aspect of the invention, there is provided a computer program product downloadable from a communication network and/or stored on a machine readable medium comprising program code instructions for implementing a method according to the first aspect of the invention.

BRIEF DESCRIPTION OF THE DRAWINGS

The above and other aspects of the invention will now be described, by way of example only, with reference to the accompanying drawings, in which.

In the drawings, like features are denoted by like reference signs.

SPECIFIC DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilised and structural, logical, and electrical changes may be made without departing from the scope of the invention as defined in the appended claims.

Figure 1:
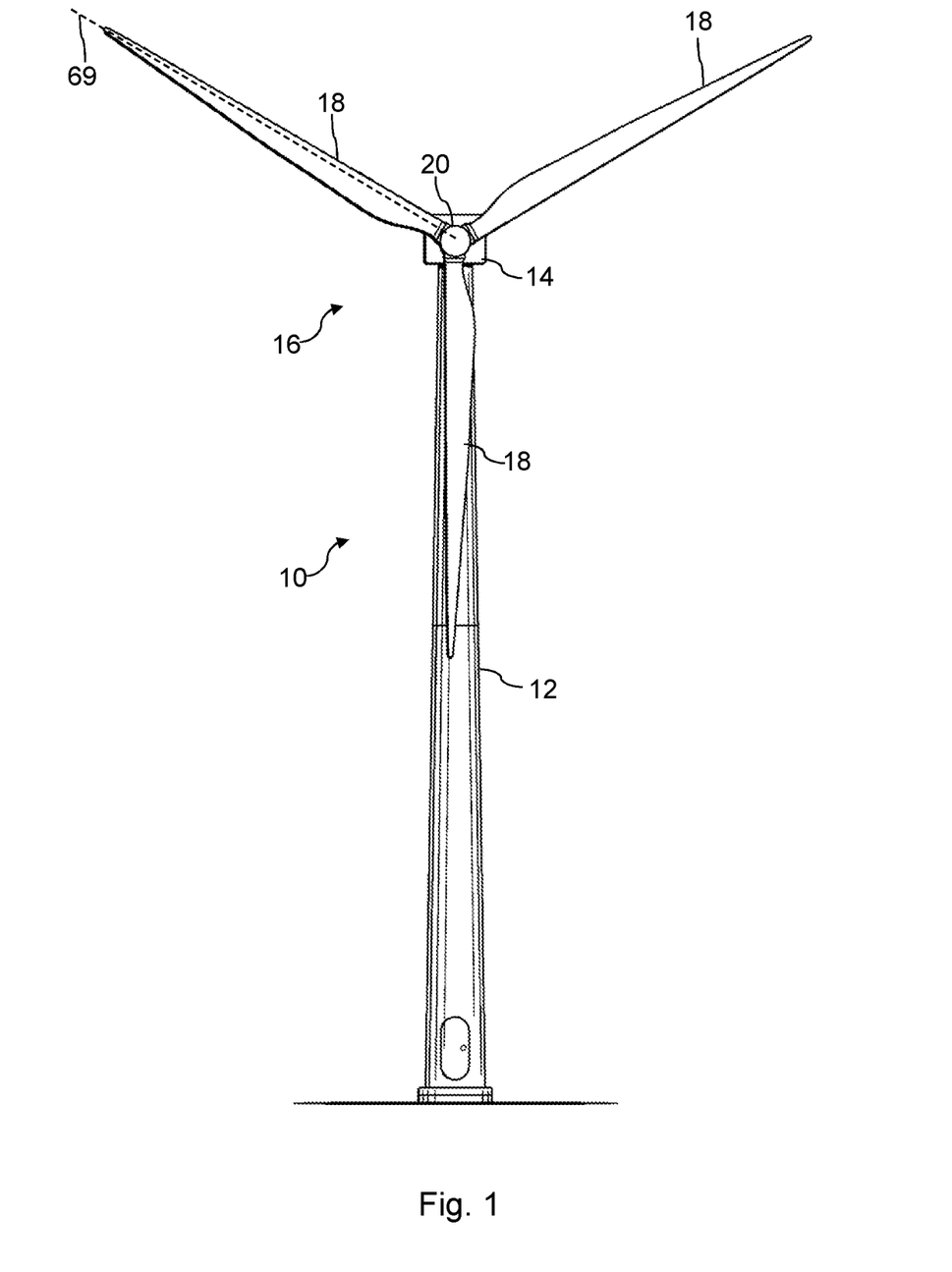
FIG. 1 is a schematic view of a wind turbine according to an embodiment of the invention.

FIG. 1 shows a wind turbine, generally designated as 10, comprising a tower 12. The tower 12 supports a nacelle 14 to which a rotor 16 is mounted. The rotor 16 is operatively coupled to a generator housed inside the nacelle 14. In addition to the generator, the nacelle 14 houses miscellaneous components required for converting wind energy into electrical energy, along with various other components needed to operate, control, and optimise the performance of the wind turbine 10. The rotor 16 comprises a plurality of rotor blades 18 extending radially from a central hub 20. In this example, the rotor 16 comprises three rotor blades 18, although it will be apparent to those skilled in the art that other configurations are possible. The rotor blades 18 are pitch-adjustable. That is to say, the pitch of the rotor blades 18 can be adjusted, about their respective longitudinal axis 69, in accordance with a collective pitch setting, where each rotor blade 18 is set to the same pitch value relating to the collective pitch setting and/or in accordance with individual pitch settings, where each rotor blade 18 may be set to its own pitch value corresponding to its individual pitch setting.

Figure 2:
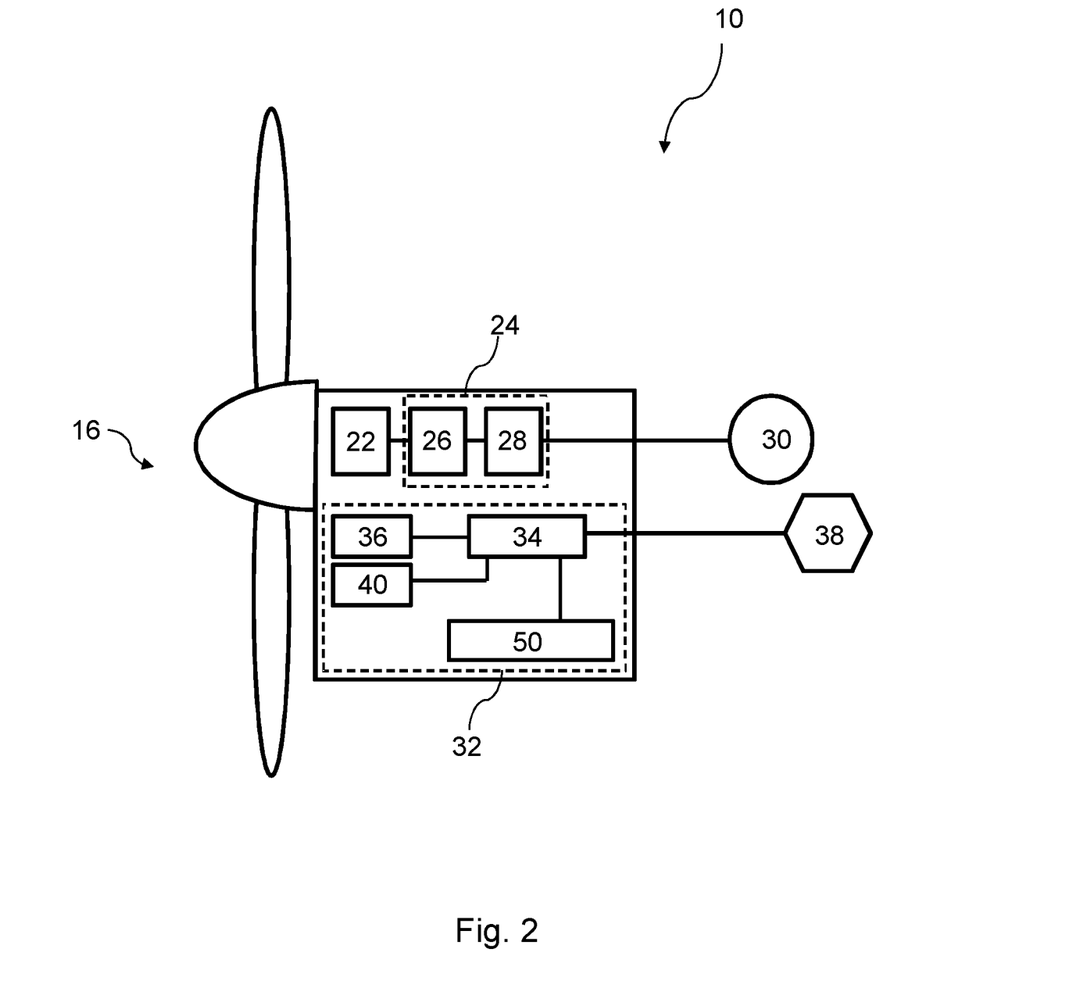
FIG. 2 is a schematic systems view of the wind turbine in FIG. 1.

With reference to FIG. 2, which is a schematic illustration of the wind turbine 10 at a systems level, the wind turbine 10 further comprises a gearbox 22 and a power generation system 24 including a generator 26 and a power converter system 28. The gearbox 22 gears up the rotational speed of the rotor 16 and drives the generator 26, which in turn feeds generated power to the power converter system 28. Usually such a system will be based on three-phase electrical power, although this is not essential. Other wind turbine designs are known, such as "gearless" types, also known as "direct drive", as well as "belt drive" transmission types.

The generator 26 and the power converter system 28 may, as an example, be based on a full-scale converter (FSC) architecture or a doubly-fed induction generator (DFIG) architecture, although other architectures would be known to the skilled person.

In the illustrated embodiment, the power output of the power converter system 28 is transmitted to a load 30, which may be an electrical grid. The skilled person would be aware that different power conversion and transmission options exist.

The wind turbine 10 further comprises a control means 32 that is operable to monitor the operation of the wind turbine 10 and to issue commands thereto to achieve a set of control objectives. The control means 32 is shown in FIG. 2 as a simplified, schematic overview of a plurality of control units and modules, and also in FIG. 3, as a more detailed example of how specific units and modules may be arranged in order to facilitate data exchange between them.

Figure 3:
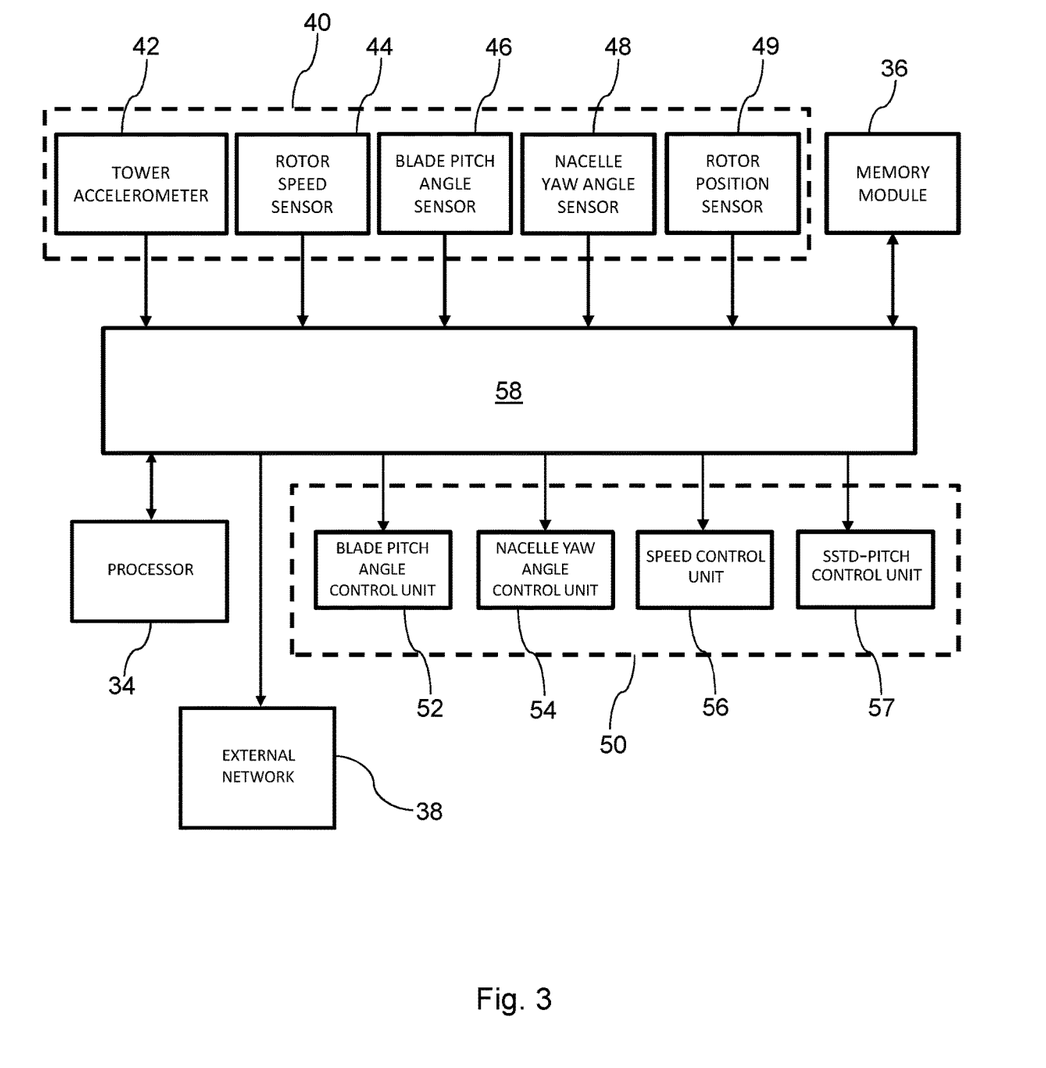
FIG. 3 is a detailed schematic systems view of a monitoring and control system of the wind turbine system of FIG. 2.

The control means 32 comprises a processor 34 configured to execute instructions that are stored in and read from a memory module 36 and/or an external data store that forms part of an external network 38. Measurement data may also be stored in the memory module 36, and recalled in order to execute processes according to the instructions being carried out by the processor 34.

Instructions and data may also be received from external controllers or sensors that form part of the external network 38, and recorded data and/or alerts may be issued over the external network 38 to be stored/displayed at an external source for analysis and remote monitoring.

In addition, the processor 34 is in communication with a plurality of sensors 40 that are disposed within the wind turbine 10. For example, as shown in FIG. 3, the plurality of sensors 40 may comprise a tower accelerometer 42, a rotor speed sensor 44, a blade pitch angle sensor 46, a nacelle yaw angle sensor 48 and a rotor position sensor 49.

The control means 32 of the wind turbine 10 also includes at least one control unit 50.

Four control units are shown in the configuration shown in FIG. 3. These are a blade pitch angle control unit 52, a nacelle yaw angle control unit 54, a speed control unit 56 and a side-side tower damping-pitch control unit 57 (hereinafter "the SSTD-pitch control unit 57). The blade pitch angle control unit 52 and the nacelle yaw angle control unit 54 are arranged to alter the pitch angle of the rotor blades 18 and the yaw angle of the nacelle 14, respectively, and the speed control unit 56 functions to control the rotational speed of the rotor 16 through converter control and pitch control. The function of the SSTD-pitch control unit 57 is discussed in more detail below. In the embodiment shown, the blade pitch angle control unit 52 and the SSTD-pitch control unit 57 are separate control units. However, the skilled reader will appreciate that the respective functionalities of these separate control units 52, 57 could be delivered from a single control unit.

A network 58 forms a central connection between each of the modules (according to a suitable protocol), allowing the relevant commands and data to be exchanged between each of the modules accordingly. However, it will be appreciated that suitable cabling may be provided to interconnect the units. It will also be appreciated that the wind turbine 10 could include more control units 50, and that FIG. 3 is provided only to illustrate an example of a system architecture in which the invention may be implemented.

A principal function of the control means 32 is to control power generation of the wind turbine 10 so that it optimises power production under current ambient wind conditions and in accordance with demanded power generation by a transmission grid operator. However, in addition to its main power control tasks, the control means 32 may be operable to perform a suite of safety and diagnostic monitoring functions, and carry out corrective action, if necessary. In the embodiments of the invention, one of these functions is to prevent any exciting forces of the rotor 16 from resonating with the bending frequencies of the tower 12. A rotor 16 can experience exciting forces with its rotational frequency from asymmetries or imbalances in the rotor 16. For example, asymmetries in the rotor 16 may come about due to geometric errors in or misalignment of the rotor blades 18, giving rise to aerodynamic asymmetries. Any mass imbalances in the rotor 16 will also give rise to exciting rotor forces.

In general, due to the vibrational coupling between the rotor 16 and the tower 12, such exciting rotor forces can bring about a number of vibrational modes in the tower 12, which can be characterised generally as vibrations in a lateral, a torsional or a fore-aft direction. In practice, however, these vibrational modes are not always distinct from each other. That is, a lateral vibration, for example, may also cause a torsional vibration, and vice versa.

Figure 4:
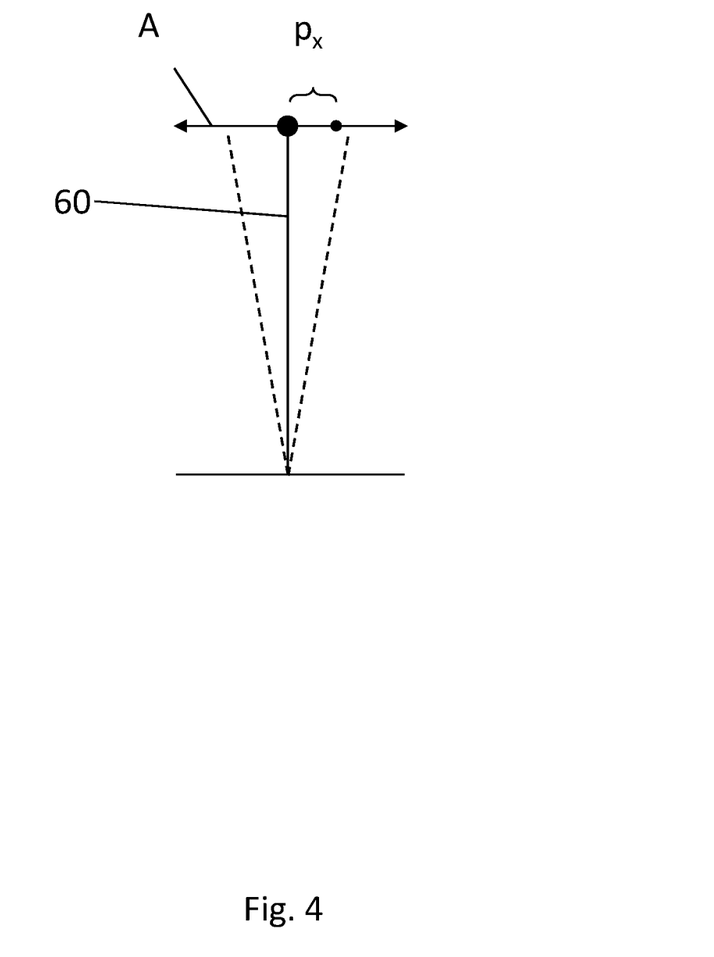
FIG. 4 is a schematic view of a lateral vibrational movement of the wind turbine of FIG. 1.

A vibration in a lateral direction is sometimes referred to as a side-side vibration. Aspects of this vibration is schematically illustrated in FIG. 4. In this figure, the turbine 10 is illustrated by a tower structure 60, which is fixed at its lower end and provided with a mass at its free end. When the top of the tower structure 60 vibrates in the lateral direction (A) the position ($p_x$) varies between two maxima defined by the maximum deflection of the tower structure 60 during the vibration. The position ($p_x$) is representative of the position of the nacelle 14 in a direction defined by the lateral movement of the tower structure 60. The position ($p_x$) may indicate the position of the nacelle's centre-of-mass, the position of a sensor housed within the nacelle 14, or the position of other fix-points representing the movement of the nacelle 14 in the lateral direction. Movement could be detected using an accelerometer or gyroscope housed within the nacelle 14. However, it may not be necessary to detect the movement directly. Instead, an indirect detection of the movement may be used, provided that the indirect movement correlates with the movement of the nacelle 14.

Figure 5:
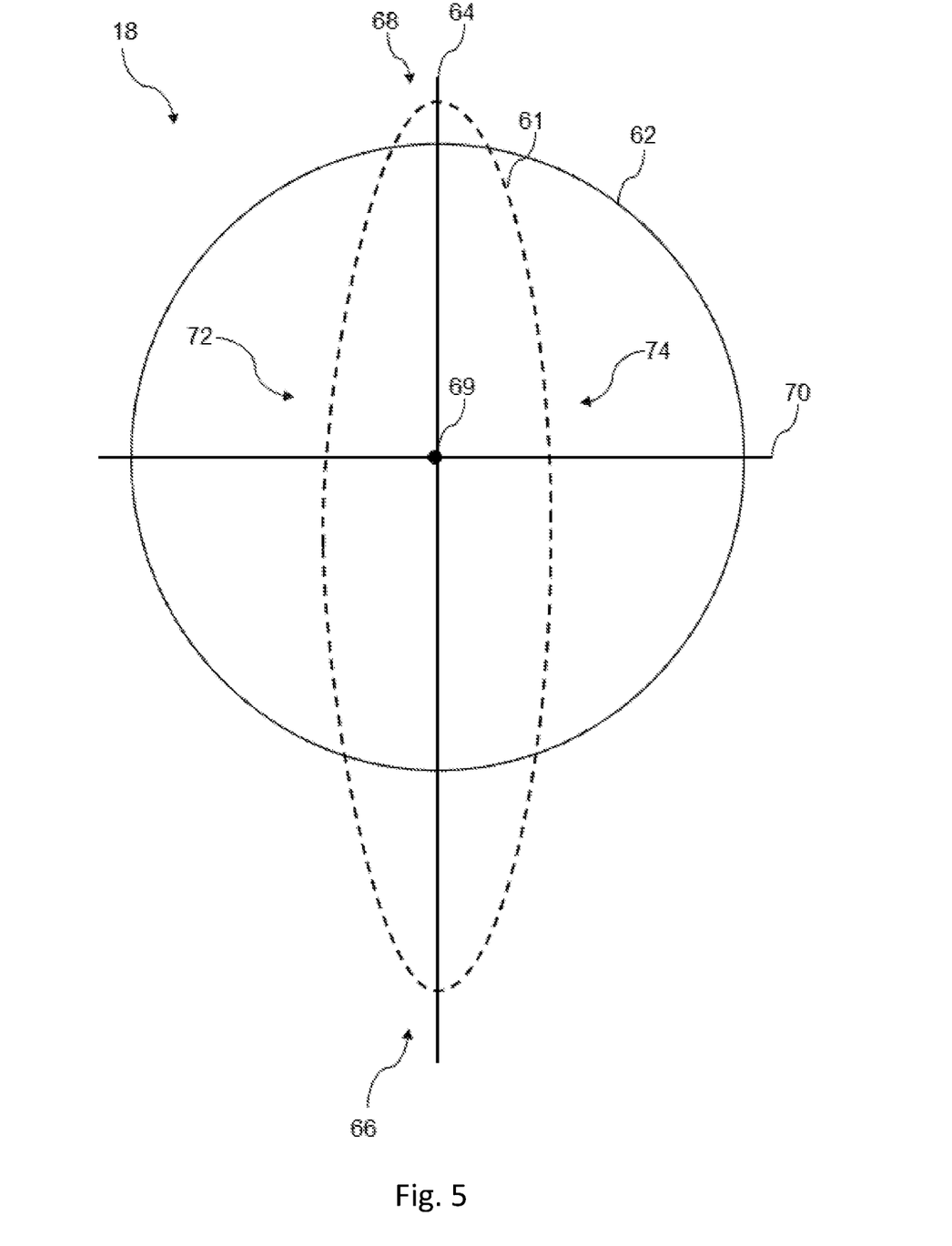
FIG. 5 is a diagram illustrating a schematic cross-section of a rotor blade of the wind turbine of FIG. 1.

Assuming a stiff rotor blade, the forces produced by the rotor blade 18 can be characterised generally as forces acting in an edgewise direction and forces acting in a flapwise direction. Referring to FIG. 5, when considering a rotor blade 18 having an outboard blade section 61, indicated by a dashed line, and a circular blade root 62, edgewise forces act in a direction generally indicated by edgewise axis 64, which extends through the leading and trailing edges 66, 68 of the rotor blade 18. Such forces are considered to be in-plane forces since they act in a direction parallel to the plane of rotation of the rotor 16. Accordingly, edgewise forces can be used to dampen exciting rotor forces resulting from asymmetries or imbalances in the rotor. Conversely, flapwise forces, also known as axial forces, act in a direction generally indicated by flapwise axis 70, which extends through the upper and lower surfaces 72, 74 of the rotor blade 18 and is substantially perpendicular to the edgewise axis 64 of the rotor blade 18. Such forces are considered to be out-of-plane since they act in a direction substantially perpendicular to the plane of rotation of the rotor 16. It is because of this that flapwise forces have no effect on dampening a side-side vibration of the nacelle 14.

Figure 6:
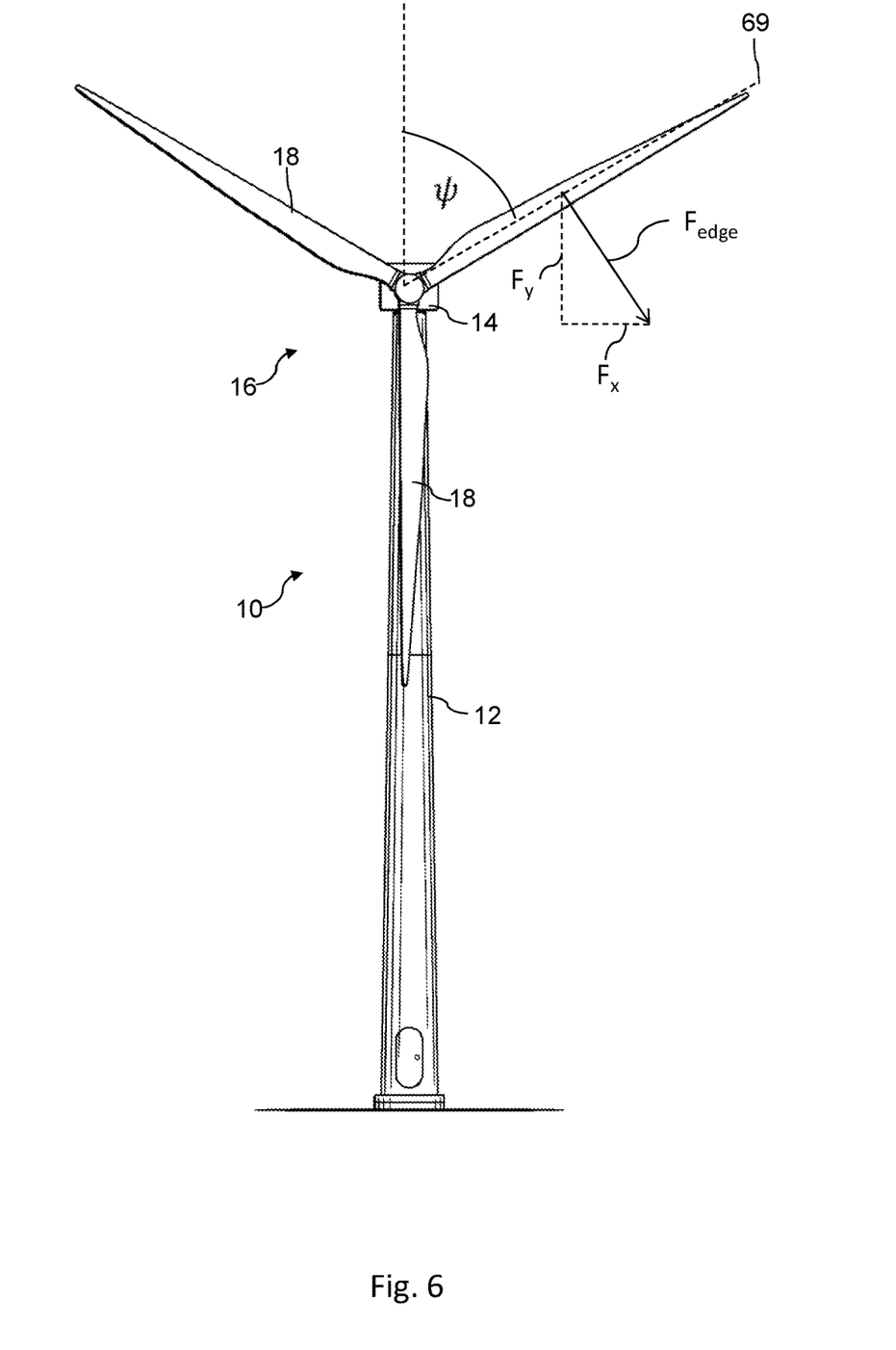
FIG. 6 is a schematic view of the wind turbine of FIG. 1 showing an edgewise force acting on a rotor blade.

By controlling the pitch of the rotor blade 18, the direction and magnitude of the edgewise force can be used to dampen a side-side vibration of the nacelle 14 in accordance with the magnitude and phase of the vibration. With reference to FIG. 6, the edgewise force ($F_{edge}$) comprises a vertical component ($F_y$) and a horizontal component ($F_x$), and it is the horizontal component ($F_x$), in particular, that is used to counteract the side-side vibration. The horizontal component ($F_x$) can be determined based on edgewise force ($F_{edge}$) and an azimuth angle ($\psi$) of the rotor blade 18, provided by the rotor positon sensor 49, using the following relationship:

$$F_x = \cos(\psi) * F_{edge}$$

The skilled reader will appreciate that the edgewise force ($F_{edge}$) comprises only a horizontal component ($F_x$) and a vertical component ($F_y$) when the rotor blade 18 is in a vertical and a horizontal position respectively.

Figure 7:
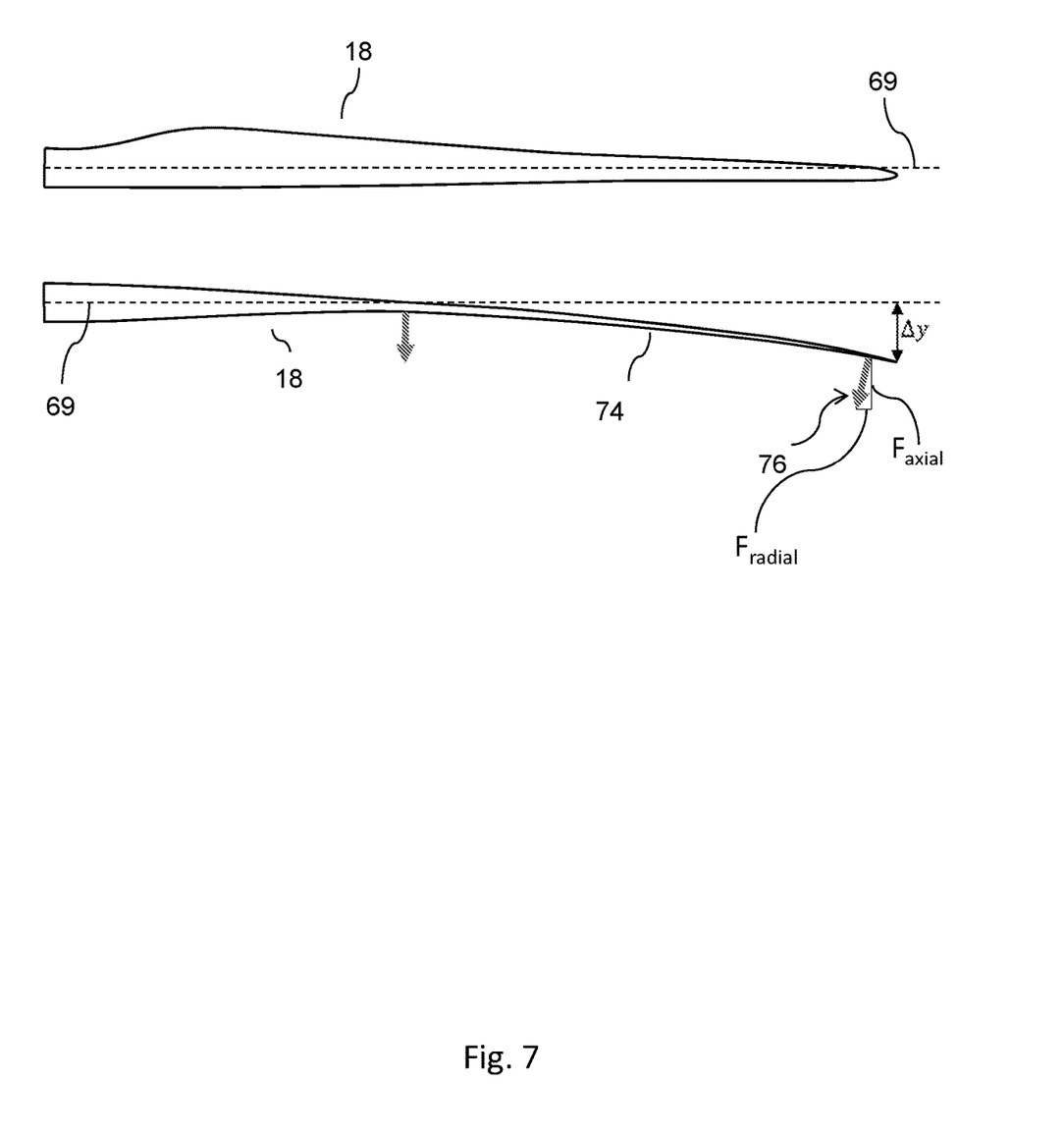
FIG. 7 is a side view of the rotor blade of FIG. 5.

Other in-plane forces act on rotor blades 18 in addition to the edgewise force ($F_{edge}$). For example, the load acting on a rotor blade 18, resulting from the lift and drag forces acting on the rotor blade 18, may cause at least the outboard section of the rotor blade 18 to deflect from its longitudinal axis 69, as shown in FIG. 7. This deflection changes the direction of the flapwise force vectors 76, which acts perpendicularly with respect to the lower surface 74 of the rotor blade 18, creating an axial force component ($F_{axial}$) and a radial force component ($F_{radial}$). The radial force component ($F_{radial}$) acts in a direction parallel to the plane of rotation of the rotor 16, and so can be considered to be an in-plane force. Other in-plane forces, comprising additional radial and edgewise forces, may also act on the rotor blade 18 due to unsteady aerodynamic conditions related to, for example, pitch dynamics, aerodynamic stall conditions and the like. It is these forces, and in particular the radial force component ($F_{radial}$) resulting from a deflection of the rotor blade 18, that the inventor has appreciated can substantially influence the magnitude and phase of the horizontal force component ($F_x$), and so its use for dampening lateral vibrations.

The radial force component ($F_{radial}$) is determined based on the loaded shape of the rotor blade 18 during operation, an example of which is shown in FIG. 7, together with the magnitude and direction of the lift and drag forces along the rotor blade 18. In one embodiment, the radial force component ($F_{radial}$) can be determined based a distance ($\Delta y$) the rotor blade 18 deflects with respect to the longitudinal axis 69, where the distance ($\Delta y$) extends perpendicularly from the longitudinal axis 69 to the tip of the rotor blade 18. In the example shown in FIG. 7, the deflection is in the flapwise direction, although other deflections that cannot be characterised solely as being in a flapwise direction may also give rise to in-plane force components. In one embodiment, the deflection and/or distance ($\Delta y$) may be directly measured using, for example, a measuring means such as a camera or a laser, or, alternatively, determined based on numerical models, such as, for example, structural and operational models. In another embodiment, the distance ($\Delta y$) may be determined by determining the bending moment of the rotor blade 18. In yet another embodiment, the deflection and/or distance ($\Delta y$) may be scheduled according to the operating conditions of the wind turbine 10. The scheduling of the deflection and/or distance ($\Delta y$) may relate to one or more of the following: thrust acting on the rotor blade 18; pitch of the rotor blade 18; rotational speed of the rotor 16; ambient wind speed; power production; and, an eigen frequency of the rotor 16 and/or the rotor blades 18.

In another embodiment, the radial force component ($F_{radial}$) can be extracted from the lift force (F) determined by integrating the lift force vector along the rotor blade 18, using the following relationship:

$$F = \tfrac{1}{2}\rho \int_0^R C_l(r)\vec{e}(r)v(r)^2 dr$$

Where $\rho$ is the air density, R is the radius of the rotor blade 18 in the lengthwise direction, $C_l(r)$ is the lift force at a radial location along the rotor blade 18; $\vec{e}(r)$ is the unit vector in the direction of the lift at the radial location; and, $v(r)$ is the induced wind speed at the radial location. It should be noted that e is dependent on the deflection of the rotor blade 18 and corresponds to the flapwise force vectors 76 shown in FIG. 7. All of these quantities can be estimated using a combined blade element momentum theory and structural model of the rotor blade 18 based on estimated/measured rotor wind speed, pitch angle and rotor speed.

Figure 8:
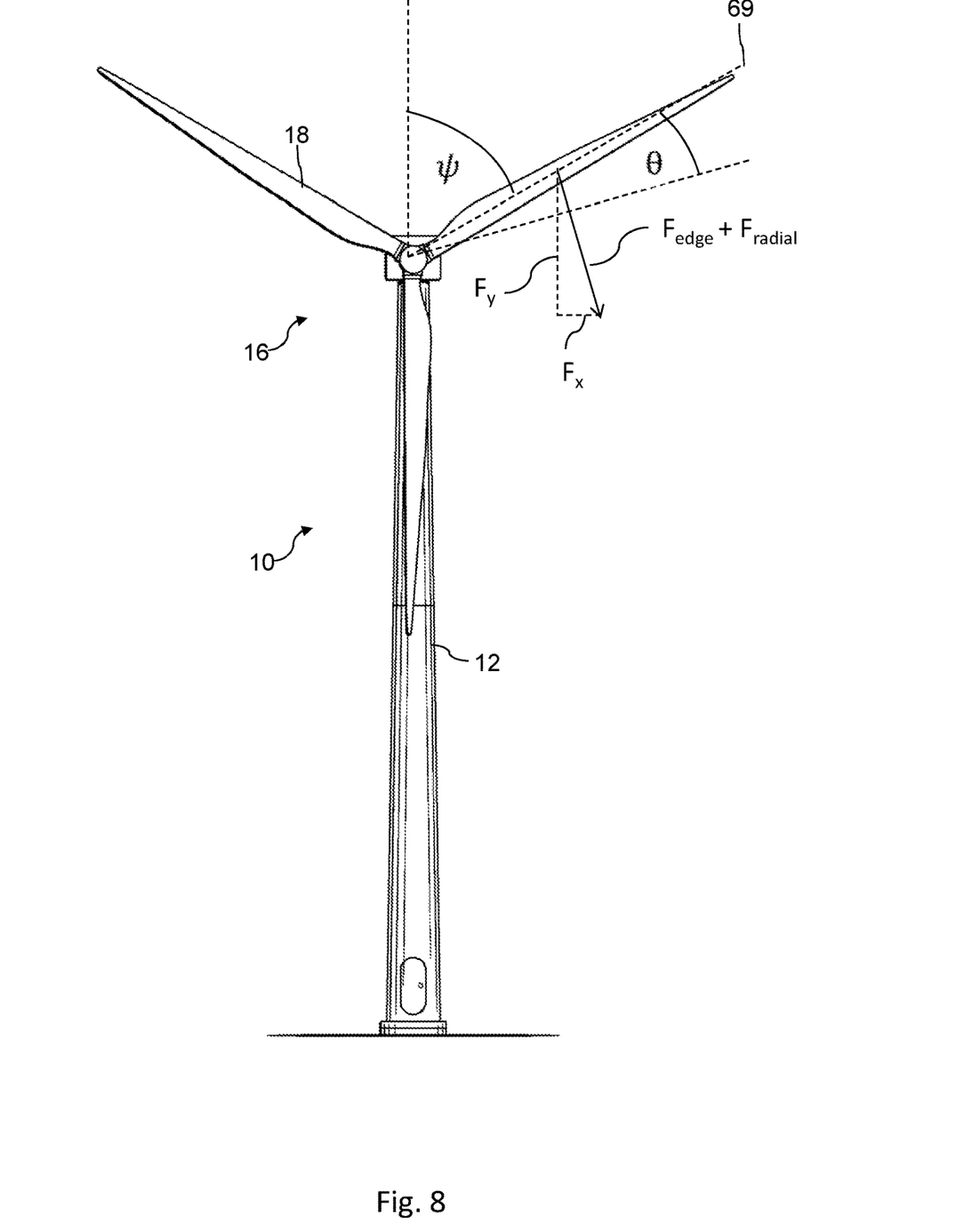
FIG. 8 is a schematic view of the wind turbine of FIG. 1 showing a resultant force acting on a rotor blade.

With reference to FIG. 8, because the radial force component ($F_{radial}$) is an in-plane force it can be added to the direction and magnitude of the edgewise force ($F_{edge}$) to produce a resultant force. The direction of the resultant force is determined by both the azimuth angle ($\psi$) and a phase ($\theta$) introduced by the radial force component ($F_{radial}$), which is determined by the following relationship:

$$\theta = \tan^{-1}(F_{radial}/F_{edge})$$

The horizontal force component ($F_x$) of the resultant force is therefore determined by the following relationship:

$$F_x = \cos(\psi + \theta)(F_{edge} + F_{radial})$$

In an embodiment of the invention, the exciting forces experienced by the rotor 16 are compensated for, generally speaking, by determining pitch signals for individually adjusting the pitch of the pitch-adjustable rotor blades 18 to provide a horizontal force component ($F_x$), based on a resultant force, that dampens a lateral movement of the nacelle 14, and so the tower 12. And because the resultant force is determined by taking into account the magnitude and direction of other in-plane forces acting on a rotor blade 18, such as the radial force component ($F_{radial}$), in addition to the edgewise force ($F_{edge}$), it is a better representation of the actual load that the rotor blade 18 is under. Accordingly, the use of the resultant force for dampening exciting forces experienced by the rotor 16 is more effective than only using the edgewise force ($F_{edge}$) The SSTD-pitch control unit 57 is configured to carry out the function the horizontal force component ($F_x$) and generally provides a closed-loop system in which the motion of the tower 12 is fed back to the pitch signals for determining the individual pitch settings. The blade pitch angle control unit 52 then applies the resulting pitch signals to the pitch-adjustable rotor blades 18 in accordance with the phase of the side-side vibration of the nacelle 14, taking into account the change in the phase (θ) introduced by the radial force component ($F_{radial}$).

Figure 9:
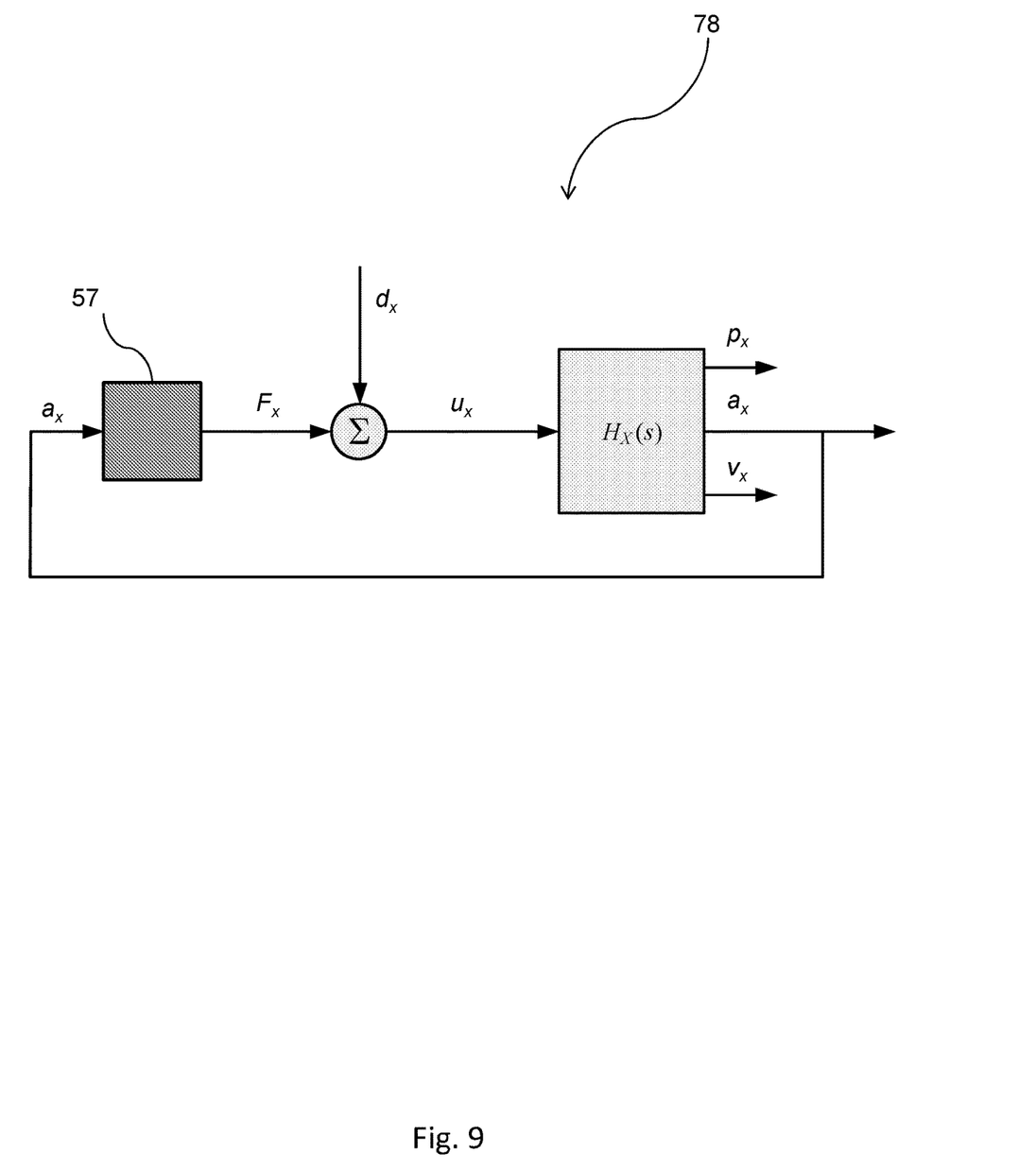
FIG. 9 is a schematic view of a closed-loop control system of an embodiment of the invention.

FIG. 9 is a linear representation of the closed-loop control system, generally designated by 78, used by the SSTD-pitch control unit 57. In this simple example of the system 78, the tower structure 60 can be represented by a mass-spring-damper system ($H_x(s)$), which is affected by a sideways force ($u_x$). The impact of any asymmetries and/or mass imbalances in the rotor 16 can be represented as an external force disturbance ($d_x$) acting on the top of the tower 12 as the rotor 16 rotates. The amplitude and phase of the disturbance ($d_x$) are determined from the magnitude of the asymmetries and mass imbalances. Assuming that the speed or frequency of the rotor 16 is constant, the external force disturbance ($d_x$) appears as a sinusoidal 1P disturbance. That is to say, the frequency of excitation of the rotor 16 due to the disturbance occurs once per revolution of the rotor 16. The sideways force ($u_x$) is based on the SSTD-pitch control 57 generating the horizontal force component ($F_x$), by cyclically pitching the rotor blades 18, and the external force disturbance ($d_x$). The mass-spring-damper system ($H_x(s)$) outputs at least one movement signal indicative of a lateral vibration of the tower 12, in the form of a tower top position ($p_x$), a tower top velocity ($v_x$) and a tower top acceleration ($a_x$). In this embodiment, the tower top acceleration ($a_x$) is then fed back to the SSTD-pitch control unit 57 so that it may control the magnitude and/or phase of the horizontal force component ($F_x$) in accordance with the magnitude and phase of the external force disturbance ($d_x$) acting on the tower structure 60.

Figure 10:
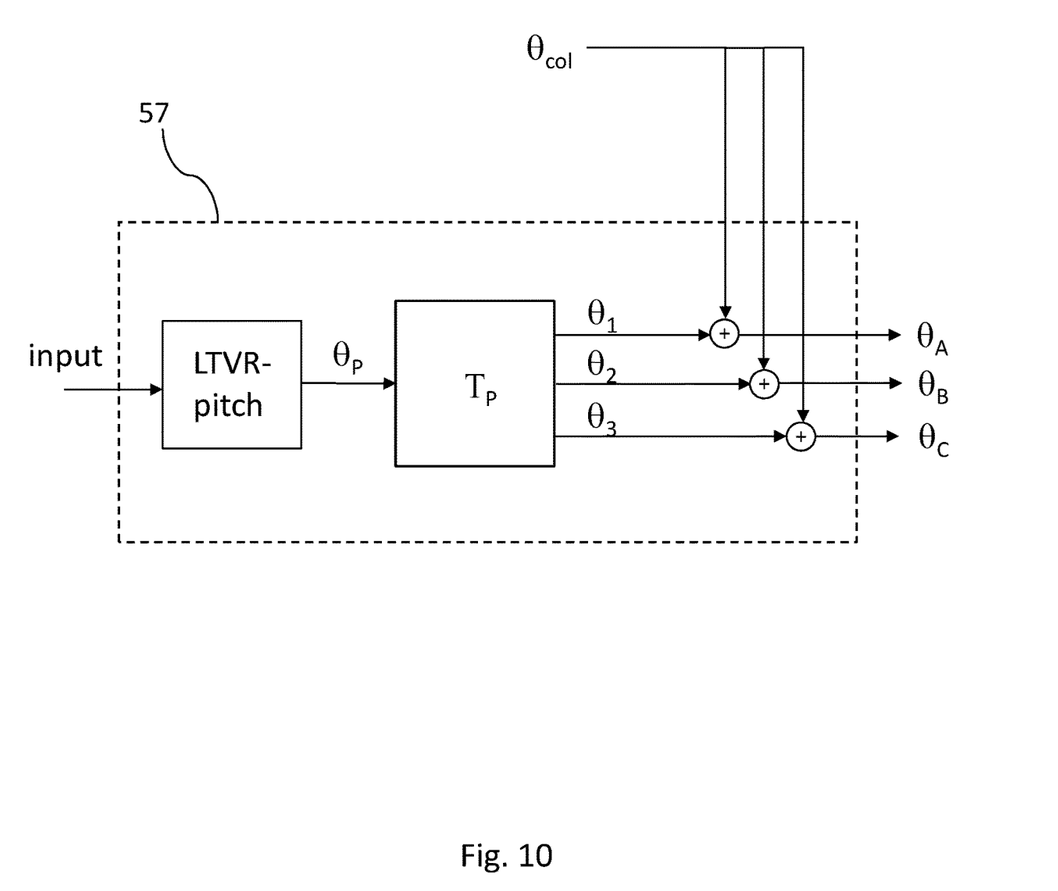
FIG. 10 is a schematic view of a control scheme of an embodiment of the invention; and, FIG. 11 is a schematic view of an embodiment of a lateral tower vibration reduction block for use in the control scheme of FIG. 10.
Figure 11:
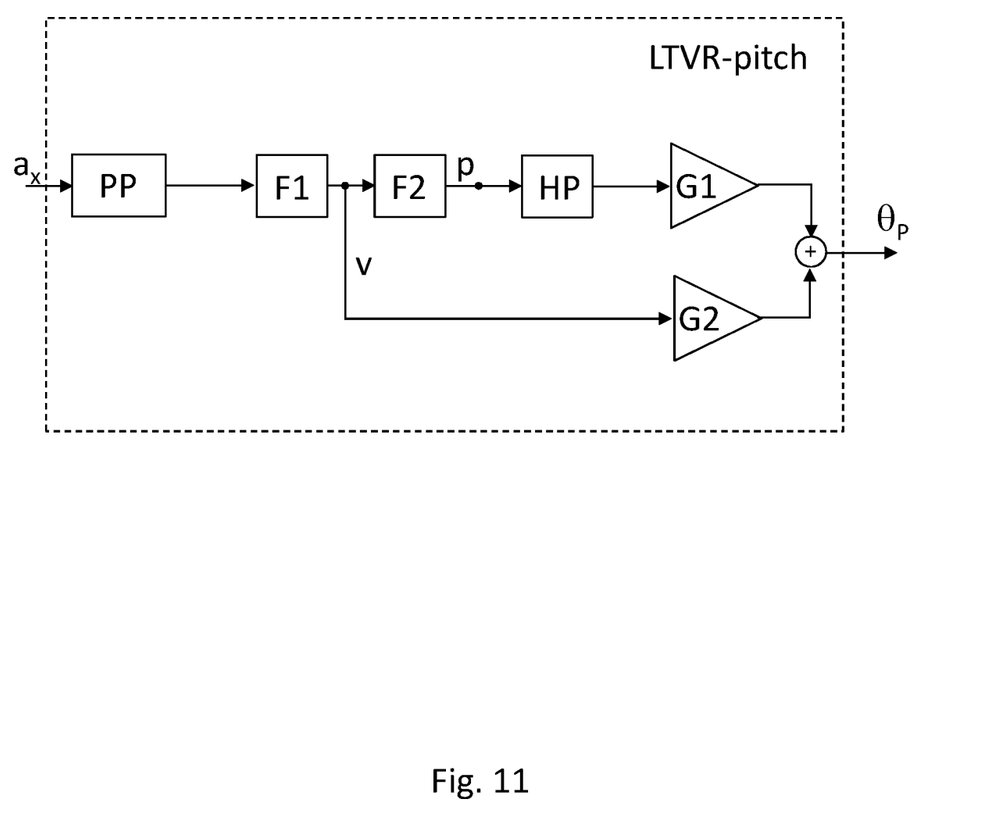

FIG. 10 is a detailed illustration of an embodiment of the SSTD-pitch control unit 57, which may be implemented by a PI, PID or similar control schemes. A lateral tower vibration reduction block (hereinafter "the LTVR-pitch block") is illustrated which shows the lateral vibration reduction by using the pitch of the rotor blades 18, where pitch actuation signals for reducing lateral vibrations are determined based on a first signal and optionally a second signal. Embodiments of the first and second signals are illustrated in FIG. 11.

The LTVR-pitch block determines an actuator signal ($θ_P$) which is transformed in a transformation unit ($T_P$) to pitch reference offset signals ($θ_1$, $θ_2$, $θ_3$) for each of the rotor blades 18 so that resulting pitch signals ($θ_A$, $θ_B$, $θ_C$) can be applied to the pitch-adjustable rotor blades 18 individually. Each individual pitch signal ($θ_A$, $θ_B$, $θ_C$) is based on the pitch reference offset signals ($θ_1$, $θ_2$, $θ_3$), and thereby on a combined signal of a collective pitch reference ($θ_{col}$) and the first signal, or a combined signal of the collective pitch reference ($θ_{col}$) and the first signal and the second signal as determined by the LTVR-pitch block.

The collective pitch reference ($θ_{col}$) is determined by the speed control unit 6 in view of the rotor speed and optionally also further sensor values.

The LTVR-pitch block determines a signal representing a desired horizontal force component ($F_x$), based on the resultant force, in the direction of the lateral movement of the nacelle 14.

The transformation ($T_p$) is to obtain resulting pitch contributions ($θ_1$, $θ_2$, $θ_3$) for each of the pitch-adjustable rotor blades 18 and may be based on a multi-blade coordinate transformation of the Coleman transformation or Fourier coordinate transformation type, which is arranged to take a signal in a non-rotating reference frame, that is, the actuator signal ($θ_P$), and transform it to a resulting signal in the rotating frame, the pitch reference offset signals ($θ_1$, $θ_2$, $θ_3$). The transformation ($T_p$) includes a phase offset parameter, which in this case is based on the azimuth angle (ψ) and the phase (θ) introduced by the radial force component ($F_{radial}$), to adjust the point at which the pitch signals ($θ_A$, $θ_B$, $θ_C$) are applied to the pitch-adjustable rotor blades 18 in order to account for the phase of the lateral movement of the nacelle 14. In some instances, without accounting for the phase (θ) introduced by the radial force component ($F_{radial}$), pitching of the pitch-adjustable rotor blades 18 would have no effect on dampening a lateral movement of the nacelle 14 because of the offset between the phases of horizontal force ($F_x$) and the external force disturbance ($d_x$). An advantage of the present invention is that it takes into account the phase (θ) introduced by the radial force component ($F_{radial}$) and other in-plane forces, and so the rotor blades 18 are pitched at a position to correctly account for the phase of the external force disturbance ($d_x$). This avoids any ineffective pitching of the rotor blades 18, causing unnecessary wear of the blade bearings used to enable the rotor blade 18 to rotate about their longitudinal axis 69.

FIG. 11 illustrates an embodiment of the LTVR-pitch block. The tower top acceleration signal ($a_x$), indicative of a vibrational movement of the tower 12, is used as an input. In this embodiment, the tower top acceleration signal ($a_x$) is an accelerometer signal obtained by an accelerometer suitably positioned to measure the acceleration of the movement of the nacelle 14 in a relevant direction.

The tower top acceleration signal ($a_x$) may be used as a raw signal; however, typically the signal is pre-processed, as indicated by "PP" in the figure. Such pre-processing may be the application of an anti-aliasing filter to remove any high frequency content that is not needed for further use. Other filters, including other band-pass filters, may be applied during the pre-processing.

The tower top acceleration signal ($a_x$), or the pre-processed version of the signal, is further processed by the application of a series of filters. In the illustrated embodiment, an estimated position signal (p), indicative of a positon of the top of the tower 12 in the relevant direction is obtained by applying in series a first integration (F1) of the acceleration signal to obtain an estimated velocity signal (v), and a second integration (F2) of the estimated velocity signal to obtain the estimated position signal (p). In this case, the estimated velocity signal (v) is indicative of a velocity of the top of the tower 12 during the vibrational movement of the tower 12. In general, any suitable filters which integrate the input signal can be applied. In an embodiment, the first and second integrations may be implemented as leaky integrators. The leaky integrators can be implemented as $1^{st}$ order low pass filters tuned with a break frequency below the $1^{st}$ for-aft mode frequency, the frequency being the system frequency comprising the tower 12, rotor 16, nacelle 14, and, optionally, also a foundation.

The first signal to the actuator capable of reducing the nacelle 14 vibration in the lateral direction may be determined as the estimated position signal (p) multiplied with a first gain (G1).

In an embodiment, the speed signal indicative of a speed of a movement of the top of the tower 12 in the relevant direction may be obtained as the estimated velocity signal (v) which results after the first integration (F1).

The second signal may be determined as the estimated velocity signal (v) multiplied with a second gain (G2).

In this embodiment, the resulting signal is sum of the first (position) and second (velocity) signals. As described, the invention may in an embodiment be implemented using the first signal only. In such an embodiment, this may be obtained by setting the second gain (G2) to zero.

In a further embodiment, also illustrated in FIG. 11, the position signal is high-pass filtered (HP) prior to determining the first signal.

The adjustment gain is applied to the first signal (G1), and optionally the second signal (G2), in order to gain adjust the first signal, and optionally the second signal, prior to applying the pitch signals ($\theta_A$, $\theta_B$, $\theta_C$) to an actuator of the wind turbine 10 capable of reducing the lateral vibration of the nacelle 14. In an embodiment, the adjustment gains (G1, G2) may be gain scheduled by including into the adjustment gain a gain scheduling term being dependent upon an operational point of the wind turbine 10. For example, the gain adjustment term may be multiplied by a factor which increases with increasing acceleration in the lateral direction.

It will be appreciated by those skilled in the art that the invention has been described by way of example only, and that a variety of alternative approaches may be adopted without departing from the scope of the invention, as defined by the appended claims.

The invention claimed is:

1. A method of controlling a wind turbine comprising a tower supporting a rotor comprising a plurality of pitch-adjustable rotor blades, the method comprising:
   obtaining a movement signal indicative of a lateral movement of the tower;
   determining a pitch modulation signal, based on the movement signal, for actuating a rotor blade to produce a desired horizontal force component to counteract the lateral movement of the tower;
   determining a radial force component acting on a rotor blade;
   determining a phase offset parameter for the rotor blade based on the radial force component; and
   transforming the pitch modulation signal into a pitch reference offset signal for the rotor blade based on the phase offset parameter.

2. The method of claim 1, wherein the radial force component is determined based on a deflection of the rotor blade.

3. The method of claim 2, wherein the deflection is in a flapwise direction of the rotor blade.

4. The method of claim 1, wherein the radial force component is determined based on a distance the rotor blade deflects from a longitudinal axis of the rotor blade.

5. The method of claim 4, wherein the distance extends perpendicularly from the longitudinal axis of the rotor blade to a tip of the rotor blade.

6. The method of claim 4, wherein the distance is determined based on a thrust acting on the rotor blade.

7. The method of claim 4, wherein the distance is scheduled according to an operating condition of the wind turbine.

8. The method of claim 4, wherein the distance is determined based on a bending moment of the rotor blade.

9. The method of claim 1, wherein the radial force component is determined based on an integration of a lift force along the rotor blade.

10. The method of claim 1, wherein the horizontal force component is a component of a resultant force based on an edgewise force acting on the rotor blade and the radial force component.

11. The method of claim 1, wherein the phase offset parameter is determined based on additional in-plane force components.

12. The method of claim 1, wherein the phase offset parameter is determined based on an azimuth angle of the rotor blade.

13. A controller of a wind turbine control system comprising a processor and a memory module, wherein the memory module comprises a set of program code instructions which when executed by the processor implement an operation of controlling a wind turbine comprising a tower supporting a rotor comprising a plurality of pitch-adjustable rotor blades, the operation comprising:
   obtaining a movement signal indicative of a lateral movement of the tower;
   determining a pitch modulation signal, based on the movement signal, for actuating a rotor blade to produce a desired horizontal force component to counteract the lateral movement of the tower;
   determining a radial force component acting on a rotor blade;
   determining a phase offset parameter for the rotor blade based on the radial force component; and
   transforming the pitch modulation signal into a pitch reference offset signal for the rotor blade based on the phase offset parameter.

14. The controller of claim 13, wherein the radial force component is determined based on a deflection of the rotor blade.

15. The controller of claim 14, wherein the deflection is in a flapwise direction of the rotor blade.

16. A wind turbine, comprising:
   a tower;
   a rotor supported by the tower and comprising a plurality of pitch-adjustable rotor blades; and
   a controller comprising a processor and a memory module, wherein the memory module comprises a set of program code instructions which, when executed by the processor, configures the processor to perform an operation, comprising:
      obtaining a movement signal indicative of a lateral movement of the tower;
      determining a pitch modulation signal, based on the movement signal, for actuating a rotor blade to produce a desired horizontal force component to counteract the lateral movement of the tower;
      determining a radial force component acting on a rotor blade;
      determining a phase offset parameter for the rotor blade based on the radial force component; and
      transforming the pitch modulation signal into a pitch reference offset signal for the rotor blade based on the phase offset parameter.

17. A program product comprising a storage medium containing code which, when executed by one or more processors, configures the one or more processors to perform an operation, comprising:
   obtaining a movement signal indicative of a lateral movement of a tower supporting a rotor comprising a plurality of pitch-adjustable rotor blades;
   determining a pitch modulation signal, based on the movement signal, for actuating a rotor blade to produce a desired horizontal force component to counteract the lateral movement of the tower;
   determining a radial force component acting on a rotor blade;
   determining a phase offset parameter for the rotor blade based on the radial force component; and transforming the pitch modulation signal into a pitch reference offset signal for the rotor blade based on the phase offset parameter.

18. The program product of claim 17, wherein the radial force component is determined based on a deflection of the rotor blade, and wherein the deflection is in a flapwise direction of the rotor blade.

\* \* \* \* \*